US007419429B2

(12) United States Patent
Taylor

(10) Patent No.: US 7,419,429 B2
(45) Date of Patent: Sep. 2, 2008

(54) BONUS PLAY METHOD FOR A GAMBLING DEVICE

(76) Inventor: William Arthur Taylor, 1326 Aspen Dr., Evergreen, CO (US) 80439

( * ) Notice: Subject to any disclaimer, the term of this patent is extended or adjusted under 35 U.S.C. 154(b) by 86 days.

(21) Appl. No.: 11/376,260

(22) Filed: Mar. 14, 2006

(65) Prior Publication Data

US 2006/0202415 A1 Sep. 14, 2006

Related U.S. Application Data

(60) Provisional application No. 60/661,425, filed on Mar. 14, 2005.

(51) Int. Cl.
*A63F 13/00* (2006.01)
*G07F 17/34* (2006.01)

(52) U.S. Cl. ....................... 463/25; 463/20; 273/143 R; 273/138.2

(58) Field of Classification Search ............ 273/143 R, 273/138.2, 138.1; 463/20, 25–27
See application file for complete search history.

(56) References Cited

U.S. PATENT DOCUMENTS 6,155,925 A * 12/2000 Giobbi et al. ................. 463/20
2002/0025846 A1 2/2002 Bennett
2003/0060266 A1* 3/2003 Baerlocher ................... 463/20
2006/0035696 A1 2/2006 Walker

* cited by examiner

*Primary Examiner*—Benjamin H Layno

(57) ABSTRACT

A method for playing a gaming device where selected bets enable various bonuses. In the preferred embodiment 5 different bonuses are offered depending on credit per line bets, and said bonuses may occur in combination.

13 Claims, 3 Drawing Sheets

Sample Bet Buttons

| | | | | |
|---|---|---|---|---|
| Play 1 Line | Play 5 Lines | Play 10 Lines | Play 20 Lines | Play 30 Lines |
| 1 Cr/Ln + Reel Spin Bns | 2 Cr/Ln + Multiplier Bns | 3 Cr/Ln + Instant Bns | 5 Cr/Ln + Match Bns | 10 Cr/Ln + Free Gms Bns |

FIG. 2

BONUS PLAY METHOD FOR A GAMBLING DEVICE

This application claims priority to U.S. Provisional Application Ser. No. 60/661,425 filed on Mar. 14, 2005, which is incorporated by reference in its entirety herein.

COPYRIGHT NOTICE

A portion of the disclosure of this patent document contains or may contain material that is subject to copyright protection. The copyright owner has no objection to photocopy reproduction of the patent document or the patent disclosure exactly as appearing in the Patent and Trademark Office patent file or records, but otherwise all copyright rights whatsoever are reserved. 37 CFR 1.71(d).

FIELD OF THE INVENTION

The invention relates to gambling devices generally and in particular to a new method for playing a slot machine.

BACKGROUND OF THE INVENTION

Gambling devices, or gaming devices including slot machines, allow players to wager something of value in the hopes of winning something of greater value. Originally slot machines were mechanical devices employing 3 physical reels with various symbols painted or affixed to them. Upon inserting a coin and pulling a spring-loaded handle, the reels were set in motion and players were paid or not depending upon where the reels stopped and which symbols were displayed across the display portion of the machine.

Slot machines have evolved greatly since the original gaming devices discussed above. Most slot machines in use today are electronic computers, and the symbols are displayed in video form. Players often prefer video display slot machines over the traditional slot machines using mechanical reels. The video platform also offers more flexibility in development for manufacturers. The common term today for a gambling machine is a gaming device, which is used herein to include gambling devices such as slot machines, video poker, and other gambling games whether reel, video or otherwise.

Newer video slots typically display 5 reels side-by-side that spin on a common axis instead of the traditional 3 (or more) mechanical reels. These newer video slots usually show 3 stopping positions of each reel yielding a visible matrix of 3 rows by 5 columns. Sometimes the number of reels and reel positions displayed vary.

Players typically wager on 1 or more paylines that run in different paths through the reel positions displayed. Unlike newer models of gaming devices, early slots paid only for matching symbols straight across the center (a single payline). Traditionally the path of each payline takes 1 adjacent position of each reel, so on a 5-reel game the payline is usually 5 positions in length. However, today these payline paths may number in the hundreds, they may take any path, and they may not always span adjacent reels nor even be on contiguous reel positions. Players may wager on multiple paylines and may even wager multiple credits per payline. Reel symbols occurring in various combinations on the paylines are compared to a schedule of winning events commonly called a paytable to determine a win or loss. Often there are wild symbols that substitute for other symbols, and symbol combinations that trigger a bonus or feature game. Scatter pays are also common where certain symbol(s) pay anywhere in the visible display, and they don't have to be on any payline. Wins are usually rewarded with monetary awards from a coin hopper provided in the machine or tickets redeemable for cash.

Second screen features (or more) are common. A "second-screen" bonus game is usually separate and distinct from the normal reel display, and a player might select a car in a car race or scratch from a selection of video lottery tickets to earn credits, free games or anything of value. Some games even offer third screens or more, enhancing player interest and intrigue. These bonus game features typically occur randomly every 50 plays or so and are embedded in the game mathematics. Their occurrence is not conditioned upon an additional bet.

Some games let creative players play consecutive games without manual intervention. Sometimes players wedge a toothpick or folded matchbook cover in such a manner as to keep the play button depressed. Provided they have sufficient credits, consecutive games play off by themselves. Although these players have basically fashioned an autoplay device, each game is still a single, discrete event that requires a separate wager. However, in newer gaming devices a "game" might be comprised of multiple slot machines spins of a traditional nature plus other interactions and events.

In general, the more interactive a gaming device is, the more entertaining it is, and the greater its entertainment value the more players will play it. Accordingly, more play normally translates to greater profits for gaming device operators.

Other types of gaming devices offer side bets. For example, as disclosed in U.S. Pat. No. 6,283,474 to de Keller, players play blackjack, but may wager separately who gets closest to a "21" point score. Similarly, in U.S. Pat. No. 6,019,374 to Breeding, a gaming device is provided which offers a side bet to participate in a super jackpot game.

Side bets have also been around for a very long time. Aristocrat, a major slot machine manufacturer headquartered in Australia, makes games that offer side bets embedded within a video slot machine. Their Cashman series offers bonus features that can only be achieved when a side bet is made. This side bet is only offered when the player has first bet the maximum number of lines offered on the machine. For example, after a player bets the maximum 20 paylines they are offered the chance to make a side bet that costs the equivalent of betting another 5 paylines. Thus, these games entice the player to raise their bet. Since casinos and operators normally retain a percentage of the bet, this side bet usually results in greater revenues and profits. While this is a somewhat creative means to offer a side bet, it is still just an additional bet. Side bets are separate wagers on separate events.

Some gaming devices offer multiple bets. Triple play poker as described in U.S. Pat. No. 5,823,873 to Moody allows a player's held cards to be played as multiple poker hands with each draw performed independently, usually resulting in 3 different outcomes. Each additional hand requires an additional wager that can become expensive, since it costs 3 times as much to play.

Regardless of the type or form of gaming device—whether reel slot, video game, some other type or combination—the basic method of wagering has remained largely the same for years. The player inserts coins or otherwise obtains credits on a machine, commits a wager, plays the game and then is paid or not depending on the outcome.

Slot machines today play in many different denominations. Credits on one machine might be worth 1 cent (or less), while others are worth $100. Some machines today even allow you to select the denomination within the machine and to change it between games. One advance in slot machine development was the use of a credit meter. With a credit meter, a player could insert more coins than were needed to play a single game, and thus have a pool of funds to draw upon. Ten nickels inserted would yield ten credits, for example. Then, the player could play one game that required ten nickel credits, ten games that required one nickel credit each, or anything in between. The use of a credit meter also allowed winnings to be accumulated on the machine, instead of always being paid out in coins each time the player won. A player could rack up credits and then choose to cash out at their leisure by the use of a special button on the machine for this purpose.

In the 1980s and 1990s, slot machine manufacturers began adding currency acceptors to their machines. Players could obtain machine credits by simply inserting paper currency. In recent years, manufacturers have even added devices that could dispense currency instead of, or in addition to, coins. (These are known as note hoppers and operate similar to bank cash machines or ATMs). Many new machines pay players in paper tickets or scripts that may be redeemed elsewhere or reinserted into similar machines that read and accept such paper. These are often called ticket-printer machines. Some machines may even accept credit cards or other cards that have value.

A traditional video slot machine commonly has 2 rows of bet buttons plus a service and cashout button. The top row dictates the number of paylines, often from 1 to 9 or more. (In the case of the Cashman example cited earlier, the top row also contains the side bet button.) The bottom row has the credit per line bet buttons, which are commonly from 1 to 10. These limits change depending on the game. A typical one-cent game today may offer up to 20 paylines and 20 credits per line for a total bet of 400 credits or $4.00 per play, or more. Play is commonly initiated by pressing the credit per line button, which is multiplied by the number of currently selected paylines to arrive at the total bet.

As a promotion, casinos sometime configure certain slot machines for tournament play. Slot tournaments are player versus player competitions administered by casino staff. Players gain entry through a variety of means, such as achieving VIP status in the casino's players club, paying an entry fee or simply for signing up. In these tournaments, players do not wager anything directly or at all, but person(s) with the highest credit scores receive something of value from the casino. Since there is no wager, the slot machines are set to a free play mode where the goal is to get more credits than the other players. Players are not paid directly for credits earned. Tournaments are marketing programs that rely on gaming devices for implementation.

Time on a particular device is a huge factor in the gaming industry today. Time on device is important not only for direct profits to gaming device operators, but also indirectly. The more time spent in one gambling property means more profit opportunities for the casino. Restaurants, shows, gift shops, hotel rooms, etc., all give the casino the chance for more profits. In general, the more time a player spends in a gaming establishment, the greater the likelihood they will return and spend even more. Operators strive to keep you in their establishment, which generally means more profits, and typically provide numerous incentives such as free or inexpensive food and drinks specifically for this purpose.

Marketing studies have revealed that players do not mind losing so much, as long as they can have a good time playing. Most casino gamblers don't really expect to win, but they do expect to play for a reasonable amount of time. This is consistent with newer trends in gaming where gambling for the typical person is more of an entertainment experience. With the proliferation of casinos in America in recent years, casino gambling has become mainstream entertainment. Perhaps the most important part of that entertainment value is "time on device", or how long you get to play for your money. Time on device is critical to a positive gambling experience.

Accordingly, recent attempts have been made to ensure greater time on device for players. Perhaps the most common method today on slot machines is to offer more winners of lesser amounts. To this end slot makers design games with a greater mathematical win frequency and a reduced paytable. Especially in newer video slots these win or hit frequencies reach 50% or more. In practice, this means you might bet 10 coins per line on 9 paylines (90 coins total) only to win 20 coins. Even though this is clearly a net loss for the player, the 20 is still touted as a win. This trickling back of credits to the player takes their money more slowly, recognizes them as winners (even if they're losing) and extends their playtime for a given amount of money to bet.

One problem with high hit frequencies is that player returns become meaningless. While time on device is generally lengthened, batting 90 to win 20 eventually becomes tedious and boring. Players soon realize that in these types of gaming products, they are not really winning, even if the machine displays "winner", but rather—they have simply lost less. The reduced payable means the allure of big winners is diminished. The tradeoff of more common winners is smaller winners.

Other enticements also keep players playing longer. As mentioned occasional bonus features or second-screen events that award free plays or credits are common ways to motivate players. Random payouts and mystery jackpots (typically paid anywhere on a bank of networked gaming machines) are also popular. Progressive awards, where certain outcomes pay an amount that increases with credits played until won, also give players something special to play for. (Qualifying for progressive awards is often conditioned on players first wagering the maximum allowable bet.)

Some less common gaming devices employ a hold and re-spin feature. In these games the reels are spun once, then desirable symbols are held similar to draw poker and the rest are spun again in order to make more favorable combinations. Still other esoteric and non-traditional concepts let players buy a predetermined amount of time and play without even being present as in U.S. Pat. No. 6,077,163 to Walker.

Different jurisdictions impose different regulations onto casino operators and gaming machine manufacturers. For example, riverboat casino legislation in Mississippi resulted in casinos being built in the mud that don't even float. These riverboats don't navigate and can't even move. In other markets, however, riverboat casinos are required to cruise some distance periodically to qualify under the regulations.

Similarly, different states place different requirements onto gaming devices. One common rule requires a skill component. Thus in some markets video draw poker games are the standard. Skill is needed to make the best choice as to cards retained and cards replaced on the "draw."

Some states don't allow traditional slot machines, but only bingo or lottery games that resemble slot machines. These games, often called "Class II" games, usually require another button press or two to set the reels spinning. Commencing with the bet, a bingo card is selected. The next button push selects a series of bingo balls, and a win or loss outcome is determined in accordance with the rules of bingo. The next press sets slot machine reels spinning and the resulting outcome is that commensurate with the bingo game. As an example, a bingo winner paying 10 is represented as a slot machine result paying 10. Thus clever manufacturers have fashioned a bingo game simulating a slot machine that is legal in some markets.

Still other markets require "central determination." Unlike traditional slot machines that stand alone independent of each other, centrally determined gaming devices are networked to a central server. This server dishes random numbers or gaming device outcomes to each device on the network. Thus a central accounting point may be maintained in a government office that controls each device statewide. While imposed by regulation, this also helps with accounting controls, general security and the verification process over large jackpot payouts. These are sometimes called video lottery games. Many other variations exist on gaming devices and the systems that work with them.

As indicated lower denomination games have become very popular recently. In the early 1990s games were generally nickel, quarter and dollar denomination. Today one-cent games are among the most popular. Since the denomination has fallen, so have average bets. Thus, manufacturers and gaming device operators are striving for ways to keep the bets high to maintain profitability. To these ends, some gaming device makers incorporate elaborate second- and third-screen bonuses with multiple bonus features embedded within their video slots. But, irrespective of the wagering method, games that are too complicated are generally less successful, since most players prefer new games that are easy to learn and play. So, it is a balancing act to keep games interesting and engaging, but simple. Likewise, keeping the bets high enough to return traditional or better profits while offering lower denominations is also a major objective of game designers today.

DRAWINGS

FIG. 2 is a sample button panel that might be used in one manner of the present invention.

SUMMARY OF THE INVENTION

Figure 1:
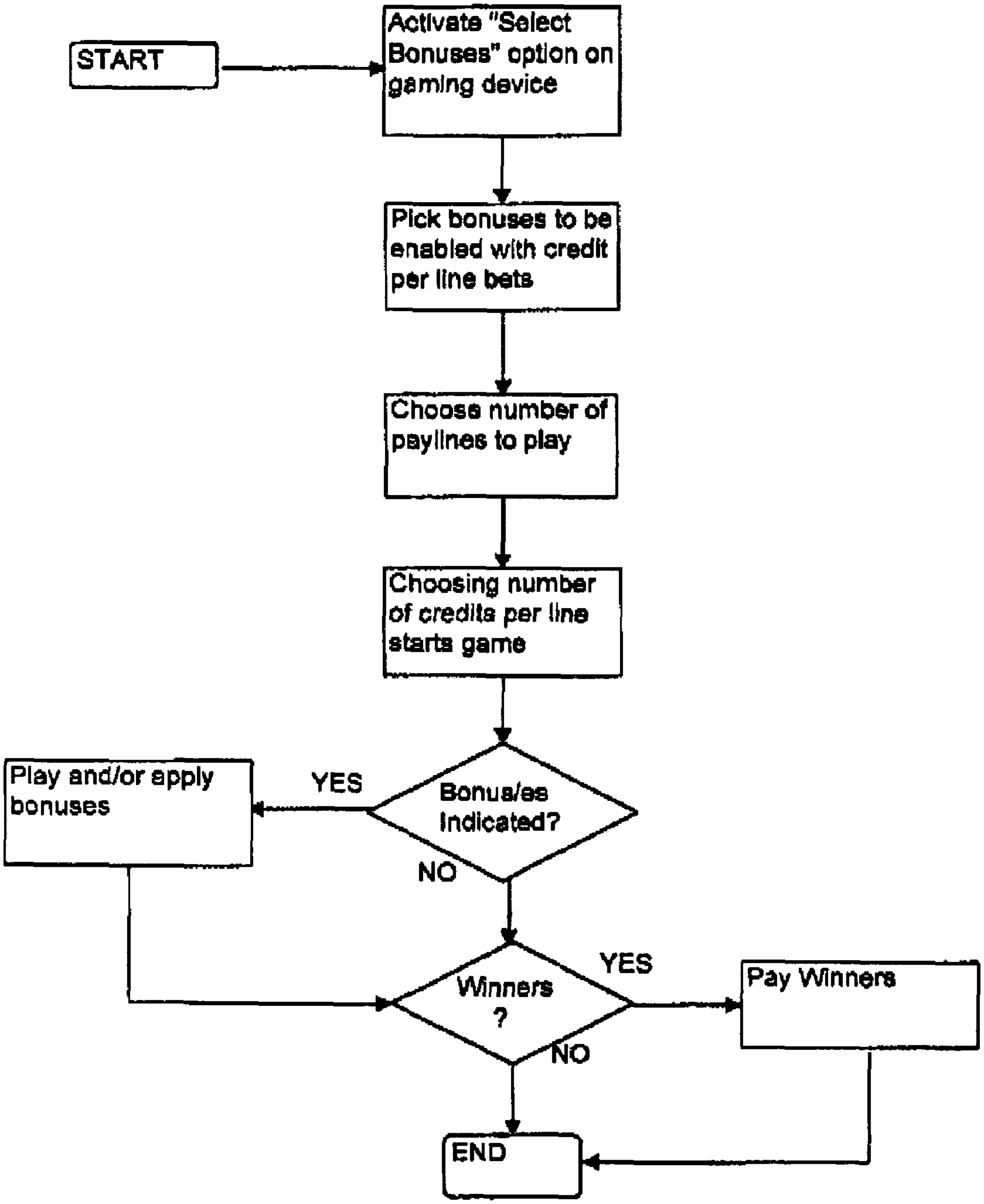
FIG. 1 is a flowchart of the steps involved in one manner of the present invention.
Figure 3:
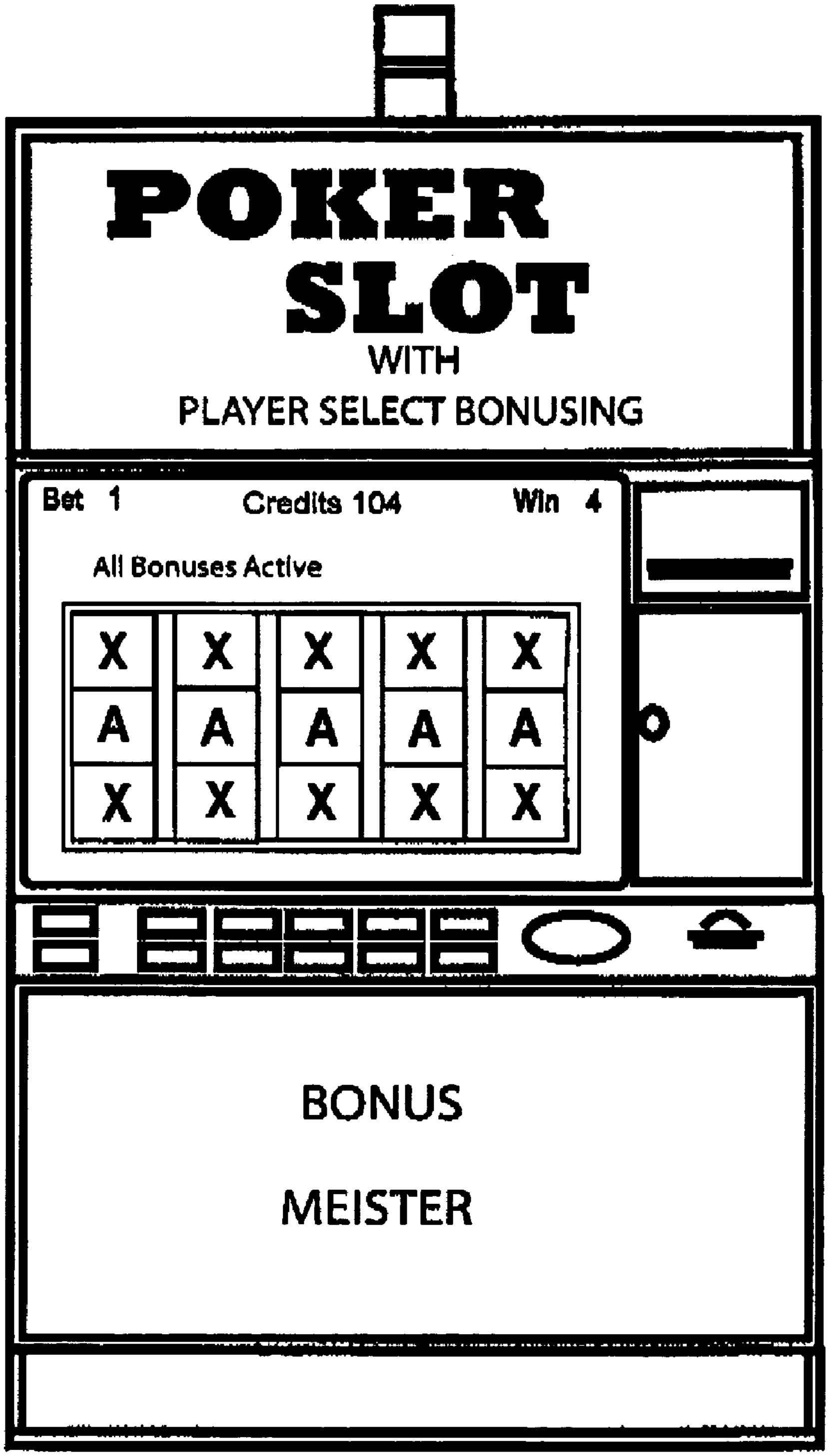
FIG. 3 illustrates the chance games that might be used to offer various forms of the present invention.

Accordingly it is one aspect of the present invention to provide new and novel games with incentives to increase the wager, that are easy to learn and implement and that are fun to play.

The present invention accomplishes these goals. In the preferred embodiment a new and novel incentive to increase the wager exists by offering more bonus game alternatives when more credits are bet per line. This embodiment is easy to learn. It is easy to implement because it uses existing button panels that are standard in the art. It gives the player more choices, which makes it more involving, more intrinsically rewarding to play and, accordingly, more fun. Finally, this new method gives players opportunity for bonuses in unique combinations.

A typical embodiment of the present invention plays as follows:

1. Enable (or activate) the slot machine by inserting cash or equivalents to obtain machine credits.

2. Make wagering selections and play a game by pressing appropriate buttons on the machine.

3. Repeat steps 1 and 2 as needed until credits are exhausted or until patron decides to terminate play. Press a cashout button to collect any remaining credits in the form of cash or equivalents.

DETAILED DESCRIPTION

A preferred embodiment is the game referred to as Bonus Meister ("BMR"). BMR employs a unique wagering method to qualify for bonus events. Here BMR ties bonus event possibilities to credit per line (also "Cr/Ln") bets.

In this example each credit per line bet qualifies the player for an additional bonus feature. Unlike existing games max coin play is not required to qualify, nor is a side bet required. It is a primary aspect of this invention that multiple bonuses and unique combinations of bonuses are possible depending on how many credits are bet per line. It is an advantage that to qualify for the most possible bonuses more credits must be bet per line. Thus this invention uses existing slot machine wagering methods in a new way to provide greater incentives to raise the bet, as well as providing the player some control over which bonuses and combinations of bonuses that are possible. As many of the best inventions are, it is relatively simple in hindsight. Thus it is easy to learn and play while at the same time making for entirely new games.

One example of the new BMR invention offers 5 popular bonuses, which are bet dependent, as follows:

1. Reel re-spins;
2. Random multipliers;
3. Instant winners;
4. Match game credit bonus; and
5. Free games.

The bet panel's upper row is traditional. In a penny denomination, expected payline choices would be 1/5/10/20/30. Since most players already cover all lines, no incentives are really needed here. (They might be added here also, however.)

The main problem is most players don't bet the maximum credits per line. So, BMR offers a new bonus possibility with each Cr/Line selection. In a likely embodiment the lower Cr/Line bets would be 1/2/3/5/10 for a max bet of $3.00 in a penny version (30 paylines×10 Cr/Ln×$0.01).

Sample Bet Buttons

| Play 1 Line | Play 5 Lines | Play 10 Lines | Play 20 Lines | Play 30 Lines |
|---|---|---|---|---|
| 1 Cr/Ln + Reel Spin Bns | 2 Cr/Ln + Multiplier Bns | 3 Cr/Ln + Instant Bns | 5 Cr/Ln + Match Bns | 10 Cr/Ln + Free Gms Bns |

Each greater credit per line bet qualifies the player for another bonus. For example, betting 1 Cr/Ln bet sometimes triggers a reel spin bonus. A 2 Cr/Ln bet may trigger a reel spin bonus or a multiplier bonus and so on. Bonuses are normally cumulative so that with the maximum Cr/Ln bet all bonuses are possible.

Each of the 5 bonuses might optionally have a probability of roughly 125:1. With max Cr/Ln bets all bonuses are possible, which would be 125:5 in this example. Restated, a bonus would then occur once every 25 plays on average. Thus, the overall bonus frequency ranges from one in 25 to one in 125, depending on the Cr/Ln wager. The player effectively buys a greater bonus hit frequency with each additional credit per line bet, and more bonus types also.

There is no requirement the bonus frequencies are the same, or that they correlate directly to credit per line bets in any way. The bonuses are just a function of the game math, and they may vary considerably from the 125:1 example. The bonuses are simply incentives and they can be tailored to achieve any percentage or spread. Further, while each bonus is made possible individually, they may or may not occur in combination. You might get an instant winner while in a free games session or a multiplier with a match game, for example, or in another embodiment the bonuses might be independent or otherwise limited.

Reel Spin Bonus. One or more reels may re-spin as in a spin-til-you-win game. Alternatively, they might re-spin randomly only after a winner. A third option is to simply re-spin on winners landing in the same positions a variable number of times. (Mathematically this last method is effectively just another multiplier.)

Multiplier Bonus. This is simply a multiplying factor applied to winners that occurs randomly.

Instant Win Bonus. An award of any number of credits.

Match Game Bonus. This is a standard bonus game whereby a player selects from a certain number of symbols with hidden values until they reveal 2 matching values. They are paid the matching value/s.

Free Games Bonus. One of the most popular bonuses is simply more free games. It is preferable, but not required, to allow all bonuses to re-occur during the free games cycle. So, you might win more free games while in a free game cycle.

The type of bonus offered with each Cr/Ln bet can be changed as needed, and may even include those not listed herein. A consideration is which bonus you want players to get betting each Cr/Ln. For example the match game bonus is better suited for greater Cr/Ln bets, since it's more interactive and takes longer to play. Another is which possible bonuses may occur in concert. In general you'd want the best bonuses reserved for greater Cr/Ln play.

In an alternate embodiment, players could select which bonuses are matched to each Cr/Ln selection.

Note here it would be possible to get all the bonuses by betting the max Cr/Ln while only playing 1 payline. That's okay because players already known their chances (hit frequency) goes way up playing more lines, even if the percentage payback doesn't. A variation might place more bonuses, other play options or player selections on the upper row. Or, other conditions may be imposed, such as requiring maximum line play first to enable any of the bonuses.

There is no absolute requirement that a traditional button panel be used to implement this invention. It is common to alter button panels as needed to accomplish any game. Of course many player selections are now made by touchscreen instead of, or in addition to the use of physical buttons.

There are many other options, variations and derivatives employing the method of the present invention. For example, the incentives offered in conjunction with the credit per line bets on the lower button row may be any selection, method, constraint or thing of value. They may or may not increase in objective or subjective value or rank as the bet is increased. They might simply increase the relative frequency of the same bonus occurrences, for example. Players may choose which bonuses or events are tied to each Cr/Ln choice. Additional bonuses, other features or potions may be offered that are not functions of the Cr/Ln selection. There may be single or multiple bonuses that correspond to different game stages, or they may vary randomly or due to other events during a game or between games. Bonuses might simply "loosen" the game, so that it pays better, more often or both. Bonuses may simply vary from game to game or otherwise.

Note the enabling of any bonus may or may not be conditioned upon a wager. The selection of a bonus does not necessarily require an explicit wager, and instead it may simply be included with the bet normally ascribed to a credit per line selection or otherwise.

There are many ways to practice, activate or enable the present invention. A side bet may or may not be an additional condition of activating the bonuses. The buttons themselves may not number 5, but may be any number. In fact, there may be no physical buttons at all, and selections may be made by video display buttons or similar and chosen by a touchscreen, keypad or other input means. The accompanying credit per line bets may be any real number including fractions or decimals. Credit per line bets do not necessarily have to yield a fixed multiple of payline bets if, for example, half of any credit per line bet is attributed as a payline multiplier and half is attributed to a bonus bet. There may be a third row of buttons used to make player selections or more. The number and/or type of bonuses, incentives, things of value or other granted for a given wager may not be fixed and may vary. They may also be conditioned upon any other game events, occurrences, player selections, bets, side bets, accumulated bets, accumulated events, external events, membership or level in a player's club or otherwise.

Consolation prizes may be granted. Said bonuses may be linked, shared or administered over a common network connecting more than 1 gaming device. Bonuses may be pooled and accumulated and drawn, granted or used later by any means or rule. Said contributions and users over the network may or may not involve player choice, or they may or may not require additional wagers to participate. The schedule of pays, or paytable, may also vary. There may be multiple paytables that correspond to different game stages, or they may vary randomly or by other events. Greater paytables may be purchased separately as in a side bet. Paytable awards may or may not be monetary values and may be free games or other things of value. Certain occurrences may be negative, that is, some game outcomes may take credits away, reduce other awards or be similarly undesirable.

This invention might be offered in combination with other traditional gaming devices incentives or features including, but not limited to, progressives or other side bets. It might be offered for tournament play, or as a Class II bingo or lottery-type game. This invention might also be coupled with more non-traditional gaming device means, such as session-play games whereby other events dictate how many traditional slot machine spins are included in a game.

The present invention may be used on other gaming devices besides slot machines as in draw poker. For example, a draw poker bonus game might deal any number of extra cards for player use. Wild cards might be granted during a bonus, or that possibility might be granted. Poker bonuses may also be conditioned on a side bet. Another bonus might allow greater hit frequencies, or a fifth poker playing card suit (or more) with new or traditional properties. Any gaming device or gambling machine or game may employ the present invention in whole or part.

As shown, there are numerous variations on the theme that fall within the scope of the present invention. This invention may be employed with any combination of options including, but not limited to, bonuses, any skill game or games having a player skill components, feature games, side bets, wagering or play methods. Thus, these and all embodiments described should be viewed as illustrative, rather than limiting.

I claim:

1. A method of providing game play to a player, the method of providing game play comprising:

a) providing a chance game wherein the chance game is a video gaming machine, the video gaming machine having a plurality of reels, each reel having a plurality of various symbols at different reel positions on the reel, a display portion of the video gaming machine displays the reel positions, the display also having a plurality of paylines that run in different paths through the reel positions displayed, providing players the opportunity to place bets on multiple paylines, and place bets on multiple credits per payline;
b) offering to such player the chance game;
c) said chance game having a means for several betting options;
d) said betting options determining the number and type of bonuses available;
e) said bonuses being enabled with credit per payline bets;
f) the player choosing one of the betting options and the number and type of bonuses available.

2. The method of claim 1 whereby the betting options include a means for players to choose which bonus is assigned to which credit per payline bet.

3. The method of claim 2 where said bonuses the player may assign include multiplier, instant win, match game, free games and reel spin.

4. The method of claim 1 wherein said display portion of the machine displays only one position of each reel, and bets are permitted on only one payline.

5. A method of providing a chance game to a player, the method of providing game play comprising:

a) providing a chance game wherein the chance game is a video gaming machine, the video gaming machine having a plurality of reels, each reel having a plurality of various symbols at different reel positions on the reel, a display portion of the video gaming machine displays the reel positions, the display also having a plurality of paylines that run in different paths through the reel positions displayed, providing players the opportunity to place bets on multiple paylines, and place bets on multiple credits per payline;
b) offering to such player the chance game
c) where prior to wagering the player may choose from a set of bonuses and said bonuses shall be available to be won depending on the credit per line bet on a one-for-one basis that is chosen by the player in advance, and
d) the set of bonuses offered may or may not include multiplier, instant win, match game, free games and reel spin where multiplier is a means for multiplying wins, instant win is a means for instantly awarding credits, match game is a means for players to reveal hidden values until two agree, free games is a means for additional plays on the gaming device without betting, and reel spin is a means to respin one or more reels on the gaming device without betting.

6. The method of claim 5 wherein said set of bonuses offered include multiple, instant win, match game, free games and reel spin.

7. The method of claim 6 wherein said set of bonuses offered are limited to multiplier, instant win, match game, free spins and reel spin.

8. The method of claim 5 wherein said display portion of the machine displays only one position of each reel, and bets are permitted on only one payline.

9. A method of providing game play to a player on a video slot machine or video poker machine whereby upping the credits bet increases the number of bonus possibilities to the player and said bonus possibilities may be decided by the player prior to commencing play, the method of providing game play comprising:

a) providing a chance game with said video slot machine having a plurality of reels, each reel having a plurality of various symbols at different reel positions on the reel, a display portion of the video gaming machine displays the reel positions, the display also having a plurality of paylines that run in different paths through the reel positions displayed, providing players the opportunity to place bets on multiple paylines, and place bets on multiple credits per payline; and with said video poker machine having a plurality of playing cards displayed on a display portion of the video poker machine, and providing players the opportunity to bet multiple credits; and
b) offering to such player the chance game;
c) said chance game having a means for several betting options;
d) such players selecting one or more possible bonuses;
e) said bonuses being enabled with credit per payline bets;
f) the player choosing one of the betting options.

10. The method of claim 9 wherein said bonus possibilities include multiplier, instant win, match game, free games and reel spin.

11. The method of claim 9 wherein said bonus possibilities are limited to multiplier, instant win, match game, free spins and reel spin.

12. The method of claim 9 wherein the player decides which bonuses are available by matching them to the credit per line bet buttons prior to betting.

13. The method of claim 9 wherein said display portion of the machine displays only one position of each reel, and bets are permitted on only one payline.

* * * * *